Nov. 27, 1928.
L. DE FOREST
1,693,071
SOUND RECORDING ATTACHMENT FOR MOTION PICTURE CAMERAS
Filed April 28, 1923    2 Sheets-Sheet 1
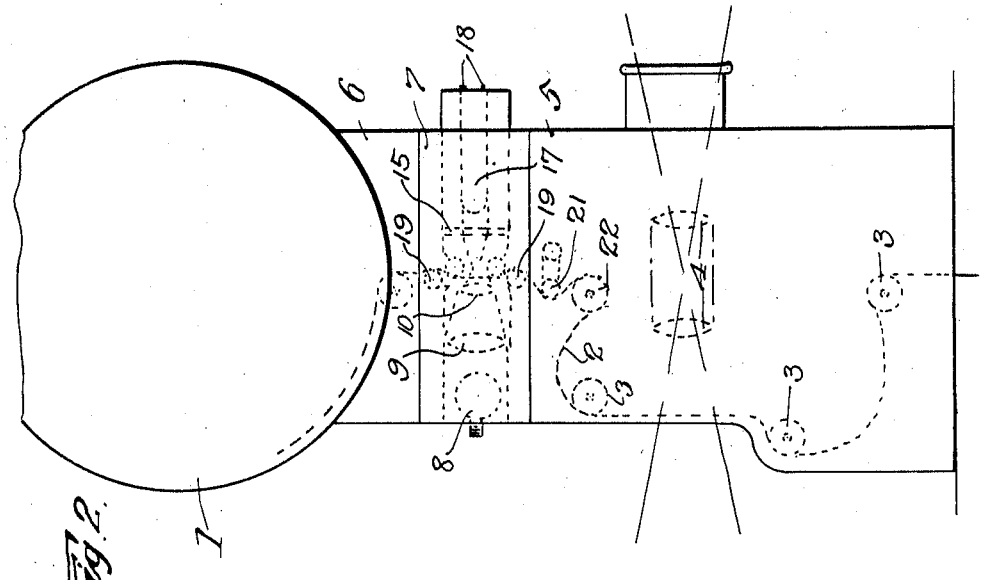
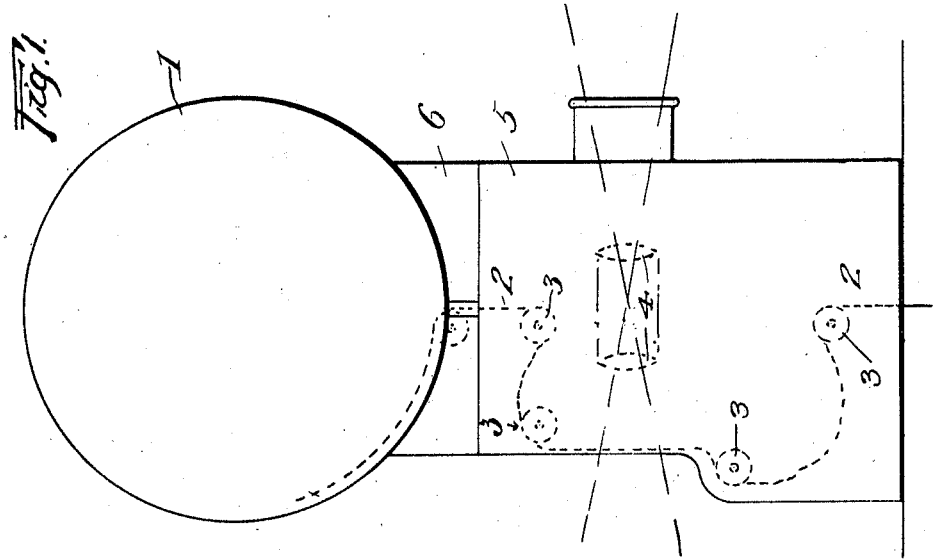

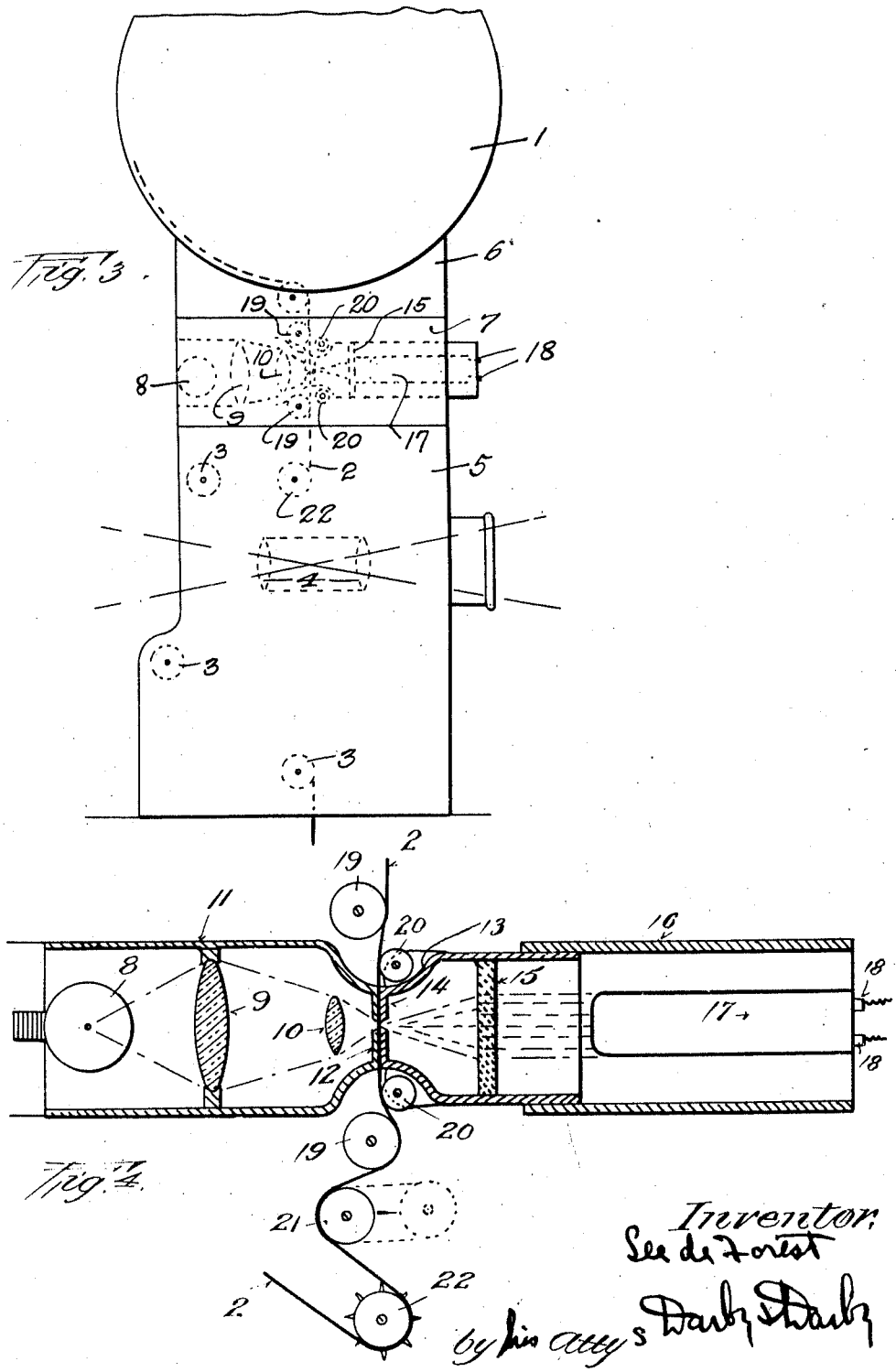

Patented Nov. 27, 1928.

1,693,071

UNITED STATES PATENT OFFICE.

LEE DE FOREST, OF NEW YORK, N. Y., ASSIGNOR TO DE FOREST PHONOFILM CORPORATION, OF NEW YORK, N. Y., A CORPORATION OF DELAWARE.

SOUND-RECORDING ATTACHMENT FOR MOTION-PICTURE CAMERAS.

Application filed April 28, 1923. Serial No. 635,334.

This invention relates to attachments for motion picture cameras to enable the same to photographically record sound waves incident to and consistent with the pictures.

The object of the invention is to provide an attachment of this character which is simple in structure, efficient in operation and economical of manufacture, and which may be readily and easily attached to the motion picture camera with minimum alteration in the motion picture camera structure.

A further object of the invention is to provide a device of this character which may be attached to the film reel support.

Further objects will appear more fully hereinafter.

The invention consists of substantially the construction, combination, location and relative arrangements of parts, all of which will be more fully hereinafter set forth in the appended claims.

Referring to the drawings,

Fig. 1 is a view in side elevation of the film reel support and camera lens of a standard type of motion picture camera.

Fig. 2 is a smaller view, showing a sound detector attachment of my invention applied thereto.

Fig. 3 is a view similar to Figure 2 showing the photo light cell gate pulled out from the film path, i. e., showing a motion picture camera equipped with the attachment of my invention with the sound picture attachment in operative position to permit the normal operation of the machine for pictures alone.

Fig. 4 is a sectional view, partially diagrammatic, with respect to the film passing therethrough and the sound recording or reproducing apparatus employed in accordance with my invention.

The same part is designated by the same reference numerals wherever it occurs throughout the other views.

While I have shown, and will now describe my attachment applied to a standard motion picture machine known as the Simplex machine, I do not wish to be limited or restricted in this respect, as it will be readily apparent to those skilled in the art that my invention may be applied to any standard type of motion picture machine. Similarly when I use the expression camera herein, I do not desire to be limited to a recording instrument as I intend to embody by that expression, a projecting machine as well.

Therefore, while I have shown and will describe as the sound recording device, the reproducing apparatus, I do not desire to be limited or restricted in this respect as with the invention herein set forth the recording apparatus may be substituted therefor.

The ordinary type of a motion picture machine is illustrated by reference character 1, and in accordance with the standard practice, the film 2 passes over suitable guide rollers 3 by the motion picture lens 4, through to the bottom mechanism, not shown. A lens portion 5, of the machine, is generally made in a part separate from the top magazine support 6, and in accordance with my invention I position the sound picture apparatus 7 between the lens portion 5 and the magazine support portion 6. The sound picture apparatus is enclosed within the casing 7, and in the form illustrated in Figure 4, consists of a source of light 8, and lenses 9 and 10, enclosed within a case 11, the lenses 9 and 10 serving to direct the light from the light source 8 through the slot aperture at the end 12 of the case 11. A film gate is formed by a case or sleeve 13, the end 14 of which is provided with a light aperture alignment with the light aperture of the end 12 of the case 11.

The sleeve 13 also has a glass window, preferably ground glass 15 therein, and the sleeve 13 is movable back and forth in a casing 16 within which is located the photo electric cell diagrammatically illustrated at 17. The photo electric cell is provided with terminals 18 to which is connected the usual wires. The casing 7 has located therein above and below the casing 11, stationary rollers 19. Suitable rollers 20 are also provided to bear on the opposite surface of the film 2, the rollers 20 being movable with the sleeve 13. The rollers 19 and 20, as above stated, are included in the casing 7 of the attachment.

In accordance with my invention, I provide an adjustable roller 21 below the stationary roller 19 to insure proper synchronism in a projecting machine between the sound record and the motion picture record, the roller 21, preferably being located between roller 19 and the top sprocket 22 of the motion picture machine. When the sound attachment is used, the sleeve 13 is moved to the position shown in Fig. 4 whereby rollers 20 are in contact with the film and the ends, 12 and 14, of the respective cases 11 and 13, are brought into adjacent position with respect to each other.

If it is desired to employ the machine for motion pictures alone, the film gate, i. e., the sleeve 13 is moved out of the way as shown in Fig. 3, whereby the end 14 and rollers 20 of casing 13 are drawn out of contact with the film, allowing the film to have a free passage through the adjustment housing 7. It will be seen from the foregoing that I have provided an exceedingly simple and efficient arrangement for combining sound photography with motion picture photography as practiced with the present types of motion picture projectors or cameras, and one which makes it possible to convert standard projectors or cameras into talking moving picture projectors or cameras at minimum expense and with minimum alteration, and at the same time permitting the normal operation of the camera or projector when desired for either purpose, without interference by the attachment while at the same time having the attachment at all times available for combined operations where desired.

Many modifications and changes in detail will readily occur to those skilled in the art without departing from the scope and spirit of my invention, and I further desire to have the foregoing description and the illustrations employed in connection therewith regarded in the illustrative sense rather than in a limited sense, but having now set forth the objects and nature of my invention, and having shown and described structures having the principles thereof, what I claim as new and useful and of my own invention, and desire to secure by Letters Patent is:

1. A sound picture attachment comprising a unit for motion picture machines, including a casing composed of two parts placed end to end to form a film path, aligned slits in the adjacent ends of said parts and means for guiding the film between said slits under tension.

2. In a sound picture attachment for motion picture machines constructed as a unit, the combination with two casings disposed with their ends adjacent to each other to form a film path therebetween, aligned slits in the adjacent ends of said casings, of means for causing the film to pass between said casings and past said slits under adjustable tension.

3. A light controlled photographic sound reproducing attachment for motion picture projecting machines, comprising two aligned casings disposed so as to provide a film path therebetween, a slit in each of the adjacent ends of said casings, a light source in one of said casings, and a light sensitive cell in the other of said casings.

4. A light controlled photographic sound reproducing attachment for motion picture projecting machines, comprising two aligned casings disposed so as to provide a film path therebetween, a slit in each of the adjacent ends of said casings, a light source in one of said casing, a light sensitive cell in the other of said casings, and means for adjusting the end of one of the casings relative to the other.

In testimony whereof I have hereunto set my hand on this 25th day of April A. D., 1923.

LEE DE FOREST.